United States Patent [19]

Matsumoto et al.

[11] 4,278,984

[45] Jul. 14, 1981

[54] CONSTANT FLOW RATE LIQUID SUPPLY PUMP

[75] Inventors: Masafumi Matsumoto; Matahira Kotani, both of Nara, Japan

[73] Assignee: Sharp Kabushiki Kaisha, Osaka, Japan

[21] Appl. No.: 70,639

[22] Filed: Aug. 28, 1979

[30] Foreign Application Priority Data

Aug. 30, 1978 [JP] Japan ............................ 53-106836

[51] Int. Cl.$^3$ ............................ G01D 15/18

[52] U.S. Cl. ............................ 346/140 R; 346/75

[58] Field of Search ............................ 346/140 R, 75

[56] References Cited

U.S. PATENT DOCUMENTS

| | | | |
|---|---|---|---|
| 3,929,071 | 12/1975 | Cialone et al. | 346/140 R X |
| 3,961,337 | 6/1976 | Jung et al. | 346/140 R |
| 4,050,078 | 9/1977 | Isayama et al. | 346/140 R |
| 4,053,902 | 10/1977 | Skafranstedt et al. | 346/140 R |
| 4,067,020 | 1/1978 | Arway | 346/140 R X |
| 4,079,384 | 3/1978 | Takano et al. | 346/140 R |
| 4,084,165 | 4/1978 | Skafrenstedt et al. | 346/140 R |
| 4,204,215 | 5/1980 | Nakarai | 346/140 R |

*Primary Examiner*—George H. Miller, Jr.

*Attorney, Agent, or Firm*—Birch, Stewart, Kolasch & Birch

[57] ABSTRACT

An ink liquid supply system for an ink jet system printer comprising an ink liquid reservoir for containing ink liquid therein, and a constant flow rate pump for supplying the ink liquid to a nozzle. The constant flow rate pump integrally includes three pressure chambers, which are divided by two diaphragms and coaxial pistons. The first pressure chamber functions to introduce an ink liquid collected by a beam gutter of the ink jet system printer for returning the ink liquid to the ink liquid reservoir. The second pressure chamber functions to introduce the ink liquid from the ink liquid reservoir and develop the ink liquid toward the third pressure chamber. The third pressure chamber receives the ink liquid from the second pressure chamber and develops the ink liquid to the nozzle.

13 Claims, 2 Drawing Figures

F/G.1

CONSTANT FLOW RATE LIQUID SUPPLY PUMP

BACKGROUND AND SUMMARY OF THE INVENTION

The present invention relates to an ink liquid supply system for an ink jet system printer of the charge amplitude controlling type and, more particularly, to a constant flow rate pump for use in the ink liquid supply system.

A constant flow rate ink liquid supply pump is essential and required in an ink jet system printer of the charge amplitude controlling type to ensure an accurate printing. The constant flow rate pump is effective not only to stabilize the ink liquid speed emitted from a nozzle but also to maintain the ink viscosity at a fixed value.

Accordingly, an object of the present invention is to provide a constant flow rate pump for use in an ink liquid supply system of an ink jet system printer of the charge amplitude controlling type.

Another object of the present invention is to provide a constant flow rate pump which is small in size.

Still another object of the present invention is to provide a small pump which integrally includes a pressure chamber for supplying the ink liquid to a nozzle and another pressure chamber for introducing waste ink liquid from a beam gutter of the ink jet system printer of the charge amplitude controlling type.

Yet another object of the present invention is to provide a novel ink liquid supply system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a pump integrally includes at least two pressure chambers, which are divided by diaphragms and coaxial pistons. The first pressure chamber functions to introduce the waste ink liquid collected by a beam gutter of the ink jet system printer of the charge amplitude controlling type. The second pressure chamber functions to develop the ink liquid toward a nozzle of the ink jet system printer of the charge amplitude controlling type at a constant flow rate.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
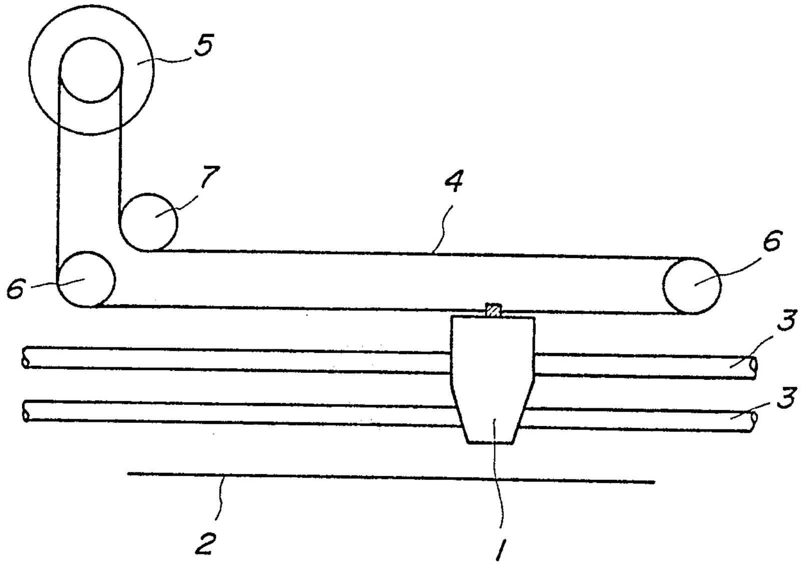
FIG. 1 is a schematic plan view of a carriage drive mechanism of an ink jet system printer of the charge amplitude controlling type.

FIG. 1 schematically shows a carriage drive mechanism of an ink jet system printer of the charge amplitude controlling type.

A printer head 1 is slidably mounted on guide rails 3, and driven to travel along a print receiving paper 2. A drive mechanism comprises a pulse motor 5 (or a DC servomotor) and a drive wire 4 (or a belt) extended between pulleys 6, a tension pulley 7 and the pulse motor 5. The drive wire 4 is fixed to the printer head 1 at a desired position, thereby reciprocating the printer head 1.

Figure 2:
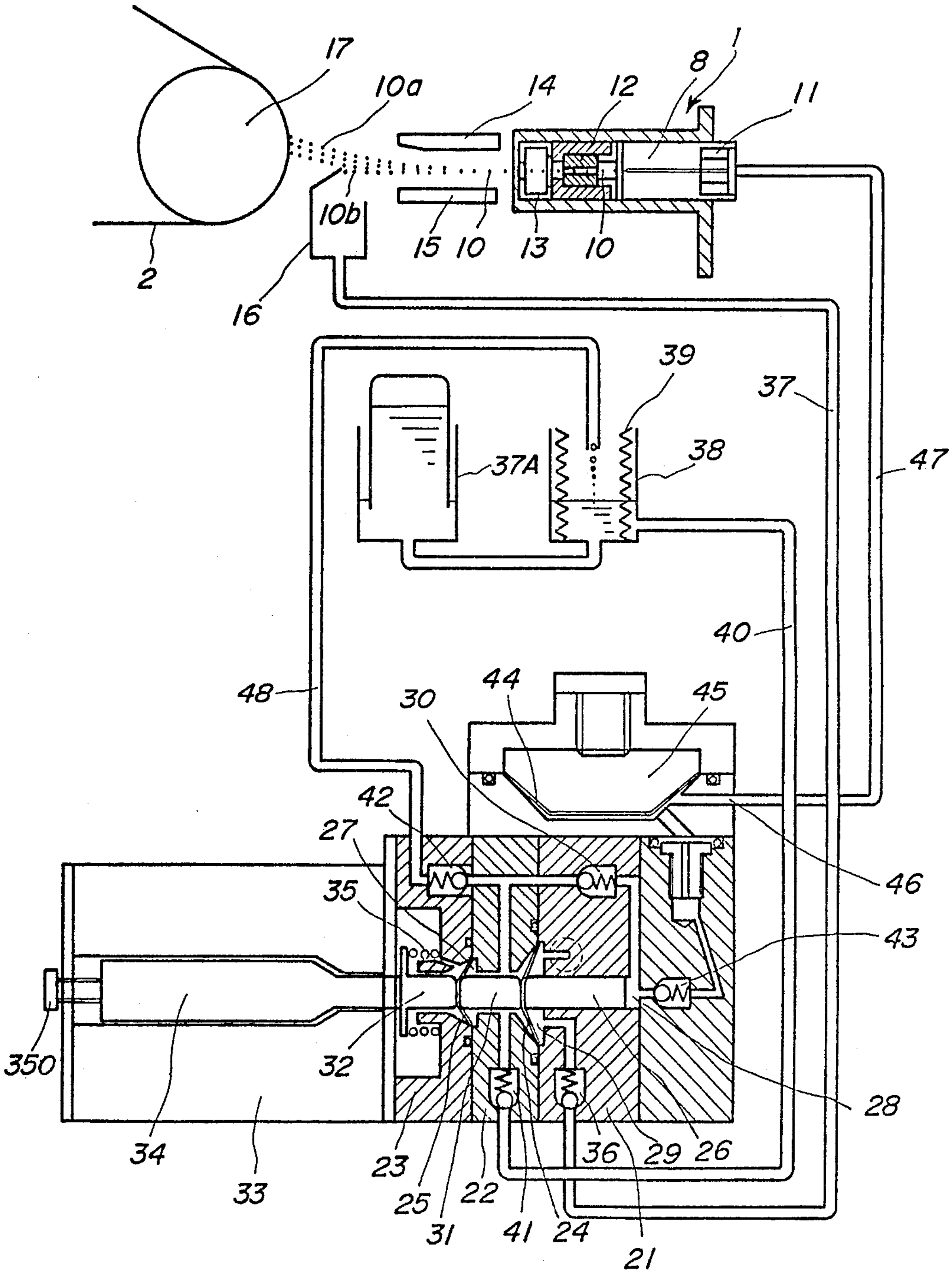
FIG. 2 is a block diagram of an ink liquid supply system for an ink jet system printer including an embodiment of a constant flow rate pump of the present invention.

FIG. 2 shows an ink liquid supply system for an ink jet system printer including an embodiment of a constant flow rate pump of the present invention.

The printer head 1 comprises a nozzle 8 for emitting an ink liquid supplied from the ink liquid supply system. An electromechanical transducer 11 is attached to the nozzle 8 to vibrate the nozzle 8 at a given frequency, thereby forming ink droplets 10 at the given frequency. The thus formed ink droplets 10 are selectively charged through the use of a charging tunnel 12 in accordance with a print information signal. A sensing electrode 13 is disposed in front of the charging tunnel 12 to detect whether the ink droplets 10 are accurately charged. An output signal of the sensing electrode 13 is used for synchronizing the application of the charging signal to the charging tunnel 12 with the droplet formation rhythm as is well known in the art.

The thus charged ink droplets 10 are deflected while they pass through a constant high voltage electric field established by a pair of deflection electrodes 14 and 15 in accordance with charge amplitudes carried thereon. Deflected ink droplets 10*a* are directed to the record receiving paper 2 which is supported by a platen 17. Ink droplets 10*b* not contributing to the actual printing operation are not charged and directed to a beam gutter 16 for recirculation purposes.

The deflection electrodes 14 and 15, and the beam gutter 16 can be incorporated in the printer head 1. The deflection caused by the deflection electrodes 14 and 15 is effected in the vertical direction, and the printer head 1 is driven to travel in the lateral direction, whereby desired patterns are formed on the record receiving paper 2 in the dot matrix fashion.

The ink liquid collected by the beam gutter 16 is returned to the ink liquid supply system through a conduit 37. The thus returned ink liquid is introduced into a constant flow rate pump, which develops the ink liquid of a fixed flow rate and a fixed viscosity to be applied to the nozzle 8 through a conduit 47. The constant flow rate and constant viscosity ink liquid is highly required to ensure accurate printing or to stabilize the droplet formation.

The constant flow rate pump mainly comprises three coaxial cylinder blocks 21, 22 and 23, and three coaxial pistons 26, 31 and 32. A first pressure chamber 28 is defined by the cylinder block 21 and the piston 26. A second pressure chamber 29 is defined by the cylinder block 21, the piston 26 and a diaphragm 24 secured between the cylinder blocks 21 and 22. A third pressure chamber 27 is defined by the cylinder block 22, the piston 31, the diaphragm 24 and another diaphragm 25 which is secured between the cylinder blocks 22 and 23. The diaphragm 24 has a diameter longer than the diaphragm 25. Pressure in the chambers 28, 29 and 27 is varied in response to the reciprocating moventent of the coaxial pistons 26, 31, 32 and the diaphragms 24 and 25.

More specifically, the diaphragm 25 is fixed to the piston 32 through the use of the piston 31. And, the diaphragm 24 is fixed to the piston 31 through the use of the piston 26. When the piston 32 is driven to reciprocate, the diaphragms 24 and 25, and the piston 26 are moved in unison with the movement of the piston 32.

The piston 32 is connected to a plunger 34 which is associated with a DC solenoid 33. The DC solenoid 33 creates the rightward movement of the piston 32. A spring 35 is disposed between the cylinder block 23 and a flange portion of the piston 32 to provide the leftward movement of the piston 32. An adjusting screw 350 is provided for adjusting the stroke length of the plunger 34. That is, the adjusting screw 350 is used for adjusting the flow rate of the ink liquid developed from the constant flow rate pump.

The second pressure chamber 29 is communicated to the conduit 37 via an inlet valve 36 in order to introduce the ink liquid collected by the beam gutter 16. The thus introduced ink liquid is returned to a recovering tank 38 through an outlet valve and a conduit (not shown). The recovering tank 38 stores the collected and returned ink liquid and a fresh ink liquid supplied from an ink liquid reservoir 37A. A filter 39 is disposed in the recovering tank 38. The ink liquid stored in the recovering tank 38 is supplied to the third pressure chamber 27 through a conduit 40 and an inlet valve 41. The third pressure chamber 27 is communicated to the first pressure chamber 28 via a valve 30. The third pressure chamber 27 is also communicated to the recovering tank 38 through a drain valve 42 and a conduit 48 for returning an excess ink liquid.

An outlet valve 43 is provided for the first pressure chamber 28 to develop an ink liquid of a constant flow rate toward a pressure accumulator 45. The pressure accumulator 45 includes a diaphragm 44 for retaining air therein. The pressure accumulator 45 functions to absorb variations in the flow rate. The ink liquid of a constant flow rate, which does not include pulsation, derived from the pressure accumulator 45 is supplied to the nozzle 8 through an outlet 46 and the conduit 47.

When the plunger 34 is driven to travel rightward by the DC solenoid 33, the pistons 32, 31 and 26 travel rightward. A negative pressure is created in the third pressure chamber 27 because the diaphragm 24 is larger than the diaphragm 25. Accordingly, the inlet valve 41 is opened to introduce the ink liquid from the recovering tank 38 through the conduit 40.

At the same time, the second pressure chamber 29 functions to develop the ink liquid contained therein toward the recovering tank 38 due to the compressing movement of the diaphragm 24. The ink liquid contained in the first pressure chamber 28 is developed toward the pressure accumulator 45 through the outlet valve 43 due to the rightward movement of the piston 26.

When the plunger 34 has been shifted right by a predetermined length, the DC solenoid 33 is deenergized. Then, the pistons 32, 31 and 26, and the plunger 34 are moved leftward due to the retaining strength of the spring 35 till the plunger 34 contacts the tip end of the adjusting screw 350.

While the pistons 32, 31 and 26 travel leftward, a positive pressure is created in the third pressure chamber 27. Accordingly, the ink liquid introduced into the third pressure chamber 27 is supplied to the first pressure chamber 28 through the conduit 30. That is, the operations of the third and first pressure chambers 27 and 28 are opposite to each other, or the operation phases are different from each other by 180°. The ink liquid supplied to the first pressure chamber 28 is determined by the volume of the first pressure chamber 28. The excess ink liquid is returned to the recovering tank 38 through the drain valve 42 and the conduit 48.

The above-mentioned cycle is repeated, whereby the ink liquid of the constant flow rate without pulsation is supplied from the pressure accumulator 45 to the nozzle 8 through the outlet 46 and the conduit 47.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer, said ink jet system printer comprising a nozzle for emitting an ink liquid supplied from said ink liquid supply system and a beam gutter for collecting waste ink droplets emitted from said nozzle and for recovering the ink liquid toward said ink liquid supply system, said ink liquid supply system comprising:

an ink liquid reservoir for containing the ink liquid therein; and a constant flow rate pump comprising:

a cylinder block;

a piston disposed in said cylinder block;

drive means for reciprocating said piston in said cylinder block;

two diaphragms fixed to desired positions of said piston;

a first pressure chamber defined by said cylinder block and an end of said piston;

a second pressure chamber defined by one of said two diaphragms, said piston and said cylinder block;

a third pressure chamber sandwiched by said two diaphragms;

a first inlet valve for introducing the ink liquid from said beam gutter to said second pressure chamber;

a first outlet valve for developing the ink liquid from said second pressure chamber to said ink liquid reservoir;

a second inlet valve for introducing the ink liquid from said ink liquid reservoir to said third pressure chamber;

valve means for supplying the ink liquid developed from said third pressure chamber to said first pressure chamber; and a second outlet valve for supplying the ink liquid developed from said first pressure chamber to said nozzle.

2. The ink liquid supply system of claim 1, wherein said first and second inlet valves and said first and second outlet valves being one-way check valve.

3. The ink liquid supply system of claim 1, wherein said drive means advances said piston within said cylinder block creating a pressure within said second pressure chamber thereby returning said ink liquid within said second pressure chamber to said ink liquid reservoir.

4. The ink liquid supply system of claim 1, wherein said diaphragm forming said second pressure chamber is larger than the other of said two diaphragms.

5. The ink liquid supply system of claim 4, wherein said drive means advances said piston within said cylinder block creating a negative pressure in said third pressure chamber being caused by the larger size of said diaphragm relative to said other of said two diaphragms, said negative pressure opening said second inlet valve thereby introducing ink liquid from said ink liquid reservoir to said third pressure chamber.

6. The ink liquid supply system of claim 1, wherein a retraction of said drive means retracts said piston within said cylinder block creating a pressure in said third pressure chamber thereby introducing said ink liquid from said third pressure chamber to said first pressure chamber.

7. The ink liquid supply system of claim 6, wherein the quantity of ink liquid introduced into said first pressure chamber being determined by the volume of said first pressure chamber and wherein excess ink liquid is returned to said ink liquid reservoir through an operatively connected drain valve.

8. The ink liquid supply system of claim 1, and further including an adjustment means for adjusting the reciprocation of said piston within said cylinder block.

9. The ink liquid supply system of claim 8, wherein said adjustment means being an adjustment screw projecting through an end wall of said cylinder block and being in engagement with an end portion of said piston to limit the reciprocation thereof.

10. The ink liquid supply system of claim 1, further comprising a pressure accumulator disposed between said second outlet valve and said nozzle.

11. The ink liquid supply system of claim 10, wherein said pressure accumulator further including a diaphragm separating said ink liquid from a pressure source, said pressure accumulator being adapted to eliminate pulsation in said ink liquid.

12. The ink liquid supply system of claim 1 or 10, wherein said drive means comprises:

a plunger fixed to the other end of said piston; and a DC solenoid for driving said plunger.

13. The ink liquid supply system of claim 12, wherein said DC solenoid is activated to advance said plunger thereby advancing said piston and a spring means being operatively connected to said piston to retract said piston and said plunger upon deenergization of said DC solenoid.

* * * * *